United States Patent [19]

Laurenz

[11] 4,437,334
[45] Mar. 20, 1984

[54] METHOD AND APPARATUS FOR DETECTING KNOCKING COMBUSTION

[75] Inventor: Werner Laurenz, Aachen, Fed. Rep. of Germany

[73] Assignee: Franz Pischinger, Aachen, Fed. Rep. of Germany

[21] Appl. No.: 348,260

[22] Filed: Feb. 12, 1982

[30] Foreign Application Priority Data

Feb. 13, 1981 [DE] Fed. Rep. of Germany ....... 3105245

[51] Int. Cl.³ ............................................. G01L 23/22
[52] U.S. Cl. ......................................................... 73/35
[58] Field of Search ................... 73/116, 35; 350/96.1; 356/241, 315; 313/129; 123/425

[56] References Cited

U.S. PATENT DOCUMENTS 2,841,979  7/1958  Harbert ............................. 73/35 UX
4,290,398  9/1981  Hattori et al. ....................... 123/425
4,377,086  3/1983  Linder et al. ............................ 73/35

FOREIGN PATENT DOCUMENTS 2829246  1/1980  Fed. Rep. of Germany .
2932193  2/1980  Fed. Rep. of Germany .
2902305  8/1980  Fed. Rep. of Germany .

Primary Examiner—Jerry W. Myracle
Attorney, Agent, or Firm—Becker & Becker, Inc.

[57] ABSTRACT

A method, and apparatus for carrying out the method, for detecting knocking operation in externally auto-ignited internal combustion engines. The radiation emitted from the combustion chamber gases is detected with a knock sensor and is passed on. Suitable as a knock sensor are photo-conductive fibers which are preferably accommodated in the central electrode of the spark plug. The radiation detected by the knock sensor is conveyed through a transmission mechanism, which can also be constructed of photo-conductive fibers, to a radiation receiver and a signal converter, for example a photo-multiplier, and is subsequently processed in a processing logic. The processing logic delivers an output signal when knocking operation exists. This output signal can either be indicated, and/or can be utilized to control the parameters which influence the knocking combustion.

22 Claims, 7 Drawing Figures

METHOD AND APPARATUS FOR DETECTING KNOCKING COMBUSTION

The present invention relates to a method for recognizing or detecting knocking combustion during the operation of an externally auto-ignited internal combustion engine, in the combustion chamber of which a physical parameter which changes during knocking combustion is detected and supplied to a processing device; the present invention also relates to an apparatus for carrying out this method.

The effective efficiency of externally auto-ignited internal combustion engines is dependent to a great extent on the level of the compression ratio thereof. Generally, it can be stated that an increase of the compression ratio by several units, based on values of modern series of internal combustion engines, especially in the partial load range, leads to considerably lower fuel consumption. This increase of the compression ratio is limited by encountering knocking engine operation at high load.

In engine technology, "knocking" denotes an abnormal combustion phenomenon which is caused by an extraordinarily rapid mixture reaction compared with a normal internal combustion engine; this rapid mixture reaction occurs toward the end of the combustion phase.

If an internal combustion engine is operated in the range of knocking combustion, a destruction of the engine can occur. To assure a destruction-free operation, internal combustion engine manufacturers today are still forced to set a definite greater deviation from the knocking limit during ignition, especially because of different fuel qualities and because of variations of the compression ratio and the ignition system, etc., of different engine series. This would prove unnecessary if through a suitable device on the internal combustion engine there could be decided during operation whether or not knocking operation exists, and if this could be used as a signal to control an operating parameter, as a result of which engine operation directly at the knocking limit would be possible. Only when this condition is fulfilled is there obtained the greatest possible effectiveness of this engine concept with high compression ratio.

Several methods and apparatus have already become known for determining knocking, according to which one or more physical parameters or a phenomenon which change only during knocking or occur only during knocking can be detected. The obtained measured signals are then utilized to control one or more operating parameters in order to avoid the knocking operation.

German Offenlegungsschrift 29 02 305, for instance, discloses arranging piezoelectrical quartz crystal pressure receivers or recorders at the combustion chamber of an internal combustion engine. These pressure receivers or recorders require one or more adaptor bores in the cylinder head. Furthermore, the measured value transfer and evaluation is expensive and extraordinarily sensitive. Although good results for determining and evaluating the knocking have been attained with this apparatus, such apparatus, because of the aforementioned disadvantages, are not suitable to be installed in mass-produced internal combustion engines. Such devices are therefore only suitable for laboratory operation.

German Offenlegungsschrift 28 29 246 discloses a device for detecting vibrations, which occur during knocking of an internal combustion engine, with the aid of a piezoelectrical flexural resonator. The vibrations arising during the knocking operation are detected and evaluated hereby. Although the measured value receivers or recorders are relatively cost advantageous, it is difficult to evaluate the measured signals thereof because of the small signal-noise differences or ratios, which in addition are dependent on the speed of the internal combustion engine. Furthermore, possible disturbances, which for example are caused by the valve closing or the ignition, must be suppressed with the aid of suitable evaluation procedures. Furthermore, a separate evaluation for each cylinder can only be carried out with extreme difficulty by a sensor and evaluation electronics, so that the costs for such a device rise with the number of cylinders.

Furthermore, it is known from German Offenlegungsschrift 29 32 193 to determine the flame duration in the combustion chamber. Ionization probes are used herefor, two of which always must be provided per cylinder to detect or determine the duration of the flame-spreading speed. In this connection it is disadvantageous that for each engine operating point during normal operation, it is necessary to know the durations, which can only be ascertained in extension teststand investigations. Because of the unavoidable manufacturing tolerances, erroneous evaluations of the sensor signals occur when using such a measuring procedure with different internal combustion engines, or even with internal combustion engines of the same production sequence or series.

It is therefore an object of the present invention to provide a method and apparatus which make possible a reliable, disturbance-free detection or recognition of knocking combustion during the operation of externally auto-ignited internal combustion engines, and especially also to avoid the indicated disadvantages.

This object, and other objects and advantages of the present invention, will appear more clearly from the following specification in connection with the accompanying drawings, in which.

Figure 3:
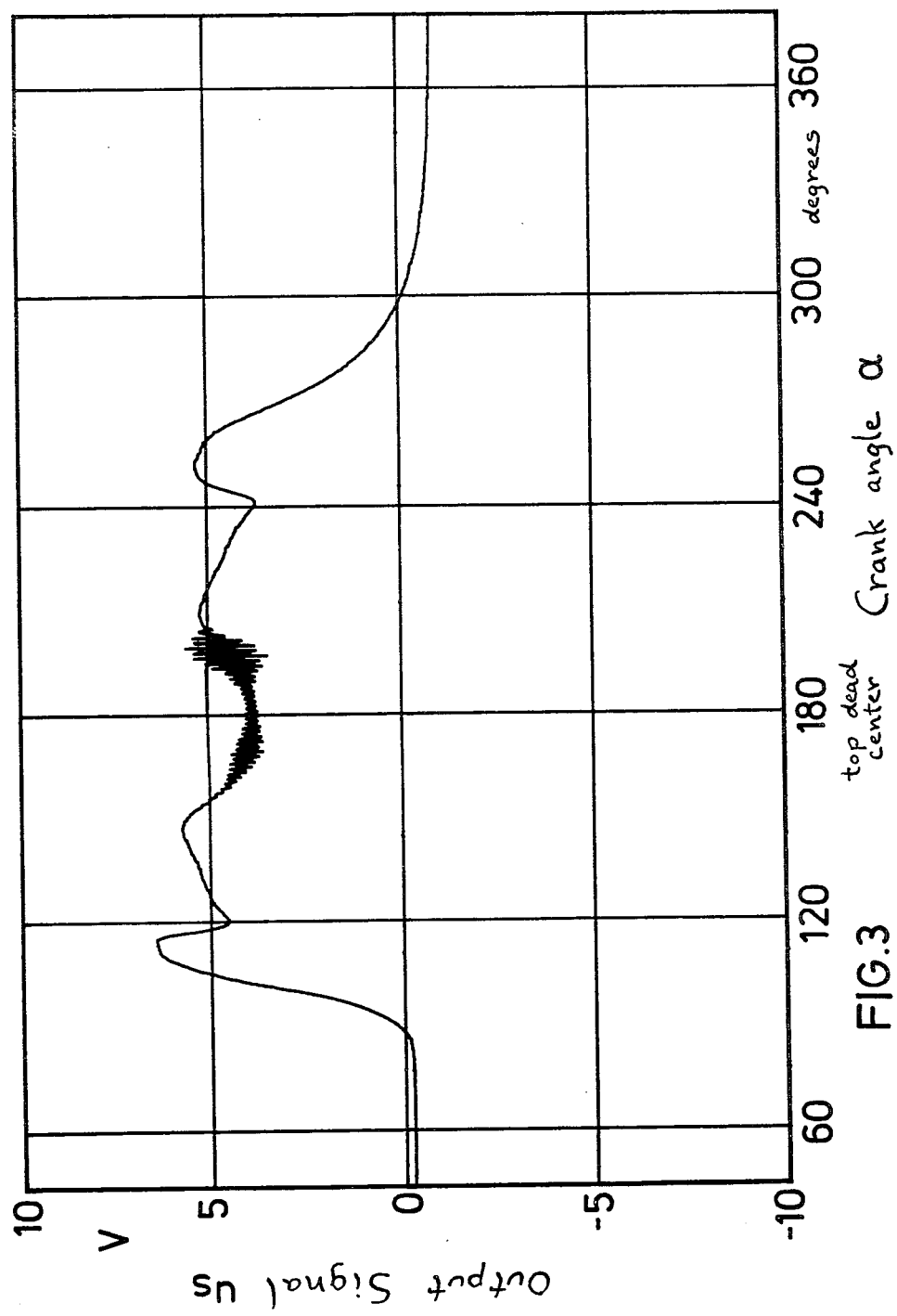
Figure 4:
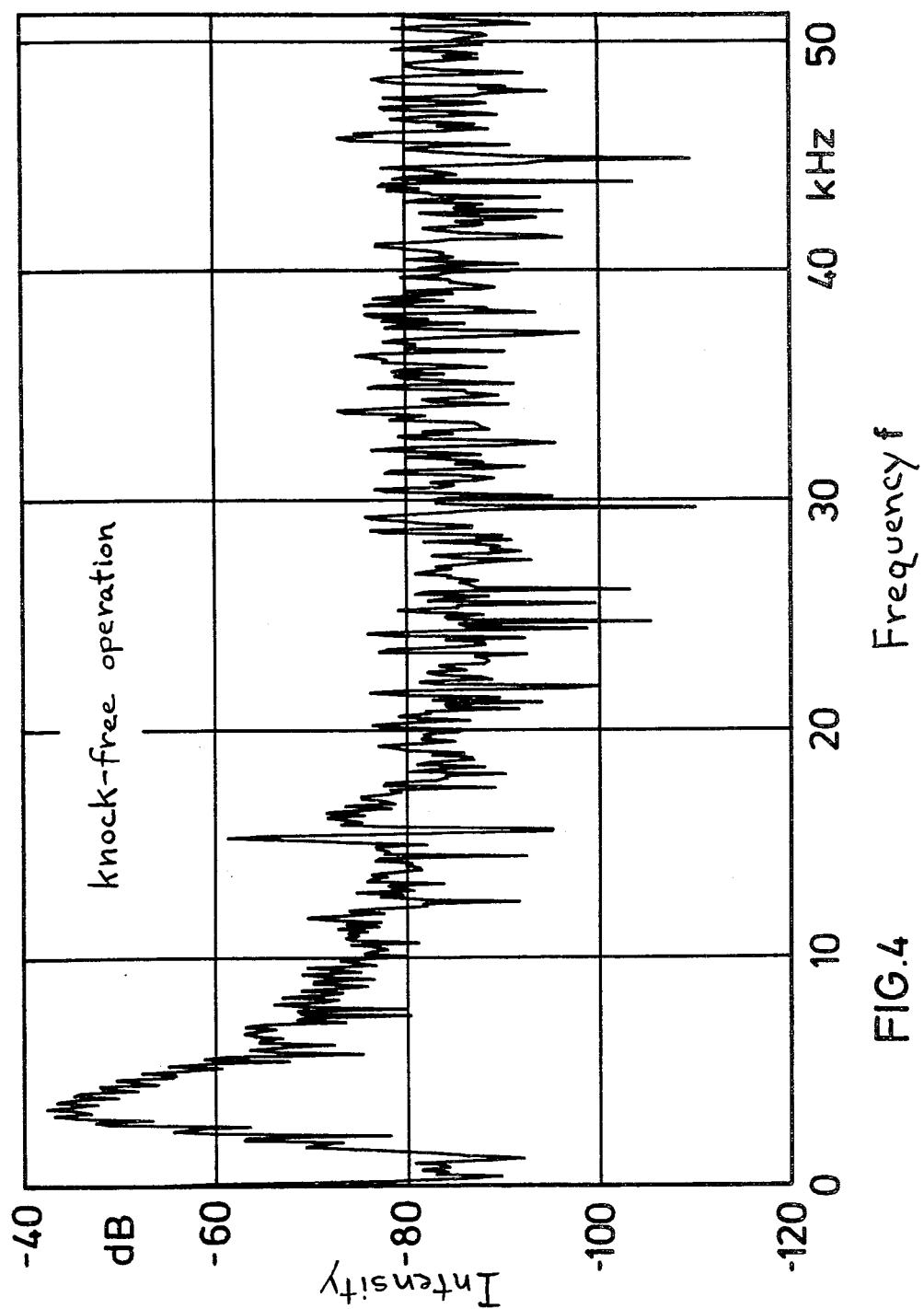
Figure 5:
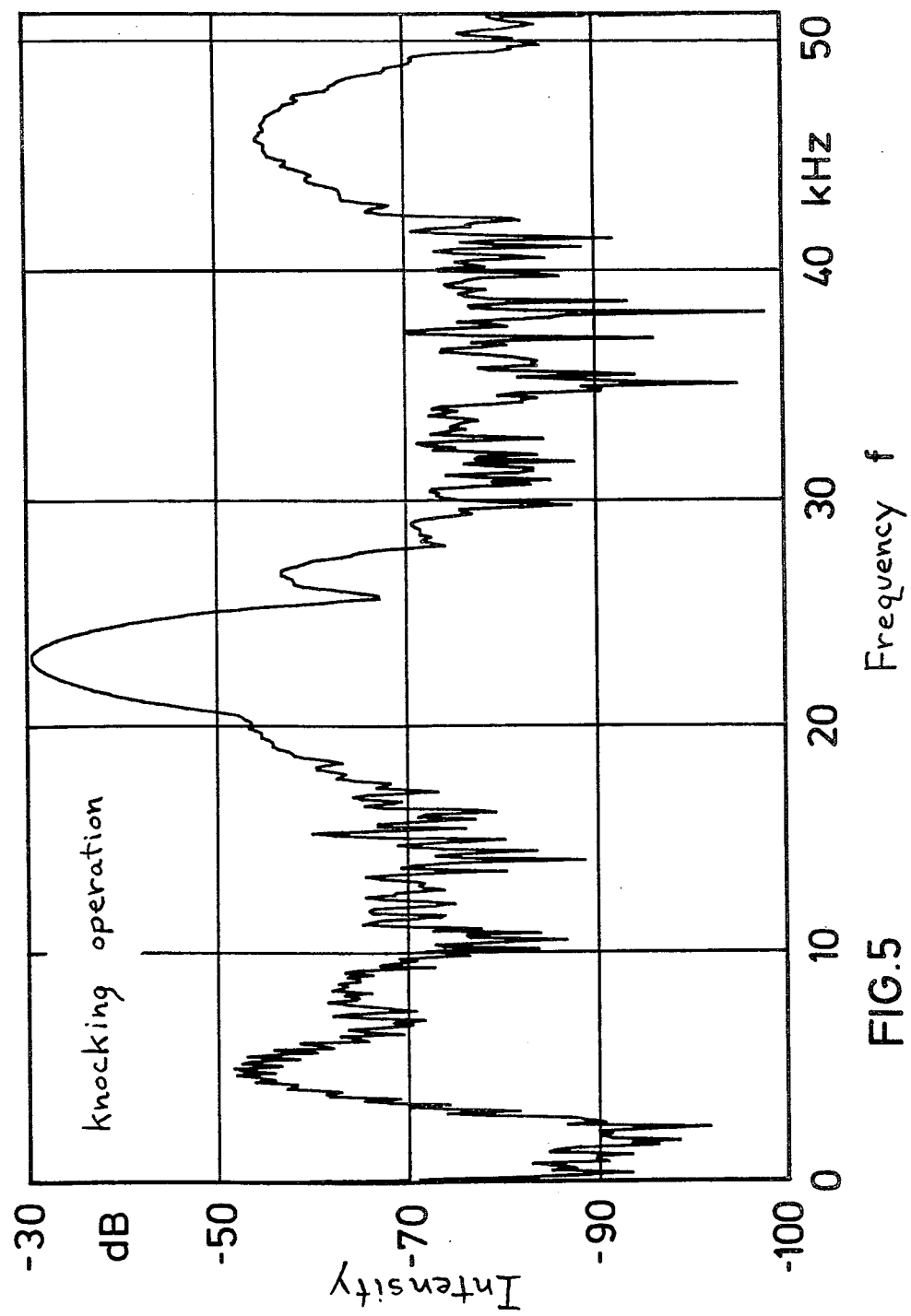
Figure 6A:
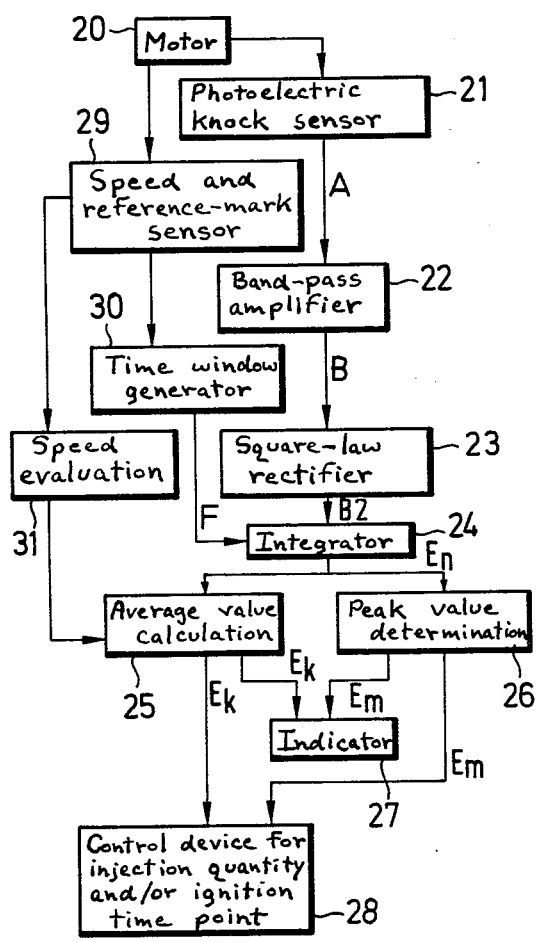
Figure 6B:
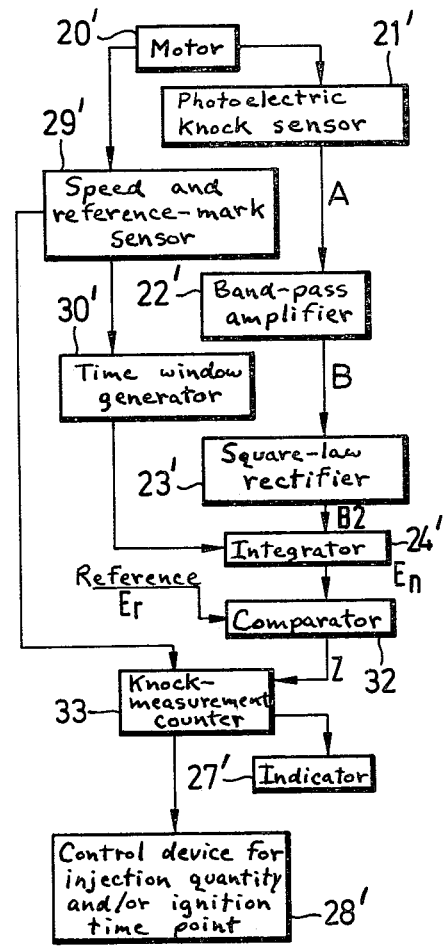

FIG. 3 graphically indicates the output signals from a photomultiplier during knocking engine operation;

FIG. 4 is a graphical frequency analysis of the output signal from a photomultiplier during knock-free operation;

FIG. 5 is a graphical frequency analysis of the output signals from a photomultiplier during knocking operation; and FIGS. 6A and 6B are block circuit diagrams of two possible arrangements of the processing logic in accordance with the present invention.

The method of the present invention is characterized primarily in that the radiation emitted by the combustion chamber gases is detected and processed. The special advantage of this method consists in that the radiation of the combustion chamber gases, which radiation changes during knocking combustion, does not contain any signals which disturb the evaluation. In addition, the radiation signals can be transmitted free of electrical as well as mechanical disturbances. A high signal-noise difference exists for the processing of the inventive signals, so that a well-defined detection of the knocking operation is assured. Furthermore, the inventive method makes it necessary to detect the radiation at only a single location in the combustion chamber, so that only a single block sensor is necessary for each cylinder, which sensor must be introduced into the combustion chamber.

An embodiment of the inventive method with which from the detected radiation only that portion of the radiation occurring during the knocking is filtered out and further processed provides the advantage that the processing device only has signals supplied thereto when knocking combustion exists. Thus, a less costly further processing of the signals results.

According to a preferred possibility of evaluation of the detected knock signals, the knock-signal energies $E_n$ are ascertained from the detected radiation for each cycle. This gives rise to the possibility, from the knock-signal energies occurring within a definite number of cycles, either to average these energies or to determine their peak values; these average or peak values are utilized for the control of one or more adjustment parameters which prevent the knocking combustion, especially such adjustment parameters as the injection quantity and/or the mixture preparation and/or the time point of ignition and/or the intake pressure.

Alternatively, the relative frequency can be ascertained with a counter device upon exceeding a definite level of the knock-signal energies, with the counter reading, with reference to the entire number of sensed cycles, representing a measure for the relative frequency $\psi$ of the knocking cycles. The thus ascertained values are used as a criteria for the control of one or more of the adjustment parameters which prevent the knocking combustion. An evaluation according to one of these alternatives can be carried out easily and in a cost advantageous manner.

Since with multiple cylinder internal combustion engines, because of the manufacturing tolerances, each cylinder has a different compression ratio, or the fuel injection of each cylinder can be different, it is advantageous to evaluate every cylinder separately and to operate each cylinder of the internal combustion engine at its knock limit. This can be accomplished according to the method of the present invention with a multiple cylinder internal combustion engine by detecting the radiation in each cylinder and conveying this radiation to a common processing device, in which an individual evaluation for each cylinder is undertaken as a function of the time sequence of the incoming radiation signals. According to an advantageous preparation of the ascertained signals, as a result of the determination and evaluation of the speed, and as a result of knowing the ignition sequence, the knock-signal energies $E_n$ can be associated with a particular cylinder, whereby for each cylinder separate average values $E_k$ and/or peak values $E_m$ and/or relative frequencies $\psi$ can be determined.

The apparatus for carrying out the foregoing method includes a knock sensor, which is arranged at the combustion chamber of an externally auto-ignited internal combustion engine, and a transmission mechanism, a processing device, and a control device, and is characterized primarily in that as a knock sensor there is provided a photoelectric sensor for visible and/or ultraviolet and/or infrared light, said sensor terminating flush with the combustion chamber wall.

In order to always keep that end of the knock sensor which faces the combustion chamber free of deposits, so that the radiation detection is not hampered, said end may be arranged in the combustion chamber wall in such a manner that the temperature prevailing there lies above the selfcleaning temperature.

The knock sensor may be arranged in the spark plug, especially in the central electrode thereof. With this feature, there is achieved the advantage that no separate bore for the knock sensor must be provided in the cylinder head. Furthermore, this arrangement offers the advantage that hereby exceeding the self-cleaning temperature is achieved with certainty.

The knock sensor may comprise light-conductive or photo-conductive fibers; however, it is also conceivable to provide other suitable sensors to detect the visible and/or ultraviolet and/or infrared light.

The signal delivered from the knock sensor may be conducted by a transmission mechanism to a processing device, which comprises a radiation receiver, a signal converter, and processing logic. These elements are utilized advantageously to prepare and process the signals delivered from the knock sensor. This arrangement, especially with photo-conductive fibers as a knock sensor, offers the advantage that the radiation receiver and signal converter need not be arranged directly on the internal combustion engine, so that they need not be subjected to the operating conditions prevailing there. The transmission mechanism necessary for this purpose can be arranged within the cable which leads to the spark plug. This entails no additional wires leading away from the cylinder head, and delivers a transmission which is completely free of mechanical and electrical disturbances. It is also conceivable to arrange suitable radiation receivers and signal converters directly on the internal combustion engine.

With photo-conductive fibers as sensors, and with one or more optical filters in the transmission mechanism, it is possible to limit the transmitted signals to that wave length range in which radiation occurs only during knocking operation. Consequently, the processing of the knock signals is facilitated. The use of simple optical filters requires no expensive filtering-out procedures for disturbance signals, which in turn are susceptible to disturbance.

Photomultipliers or other opto-electronic components may be provided as simple and reliable radiation receivers and signal converters. Photo-transistors or photo-diodes can also be used because of their cost advantages.

Frequency-selective photomultipliers or other frequency-selective opto-electronic components may be provided as radiation receivers and signal converters; these components are selected with respect to their spectral sensitivity in such a manner that only radiation of a wave-length range which occurs only during knocking is recorded.

With a multi-cylinder internal combustion engine with which each cylinder has a sensor, and with which the ignition sequence is sufficiently spaced apart, it is also possible according to the present invention that the knock signals of all cylinders be processed in only one processing device. The construction of the processing device is hereby considerably simplified without, however, having to accept any disadvantages.

According to one preferred arrangement of the processing logic for processing the output signals of the radiation receiver and signal converter, there is provided a band-pass filter, a square-law rectifier, and an integrator, as well as a crank angle or time generator. The band-pass filter hereby filters the output signal and adapts it to the level involved. The knock-signal energy can thus be ascertained for each cycle.

The processor logic may also include a comparator and/or a knock-measurement counter; with this embodiment, the knock-signal energies of each cycle may be compared with prescribed limits. Therefrom can be determined whether or not a knock cycle exists. The knock-measurement counter makes it possible to ascertain the relative frequency of knock cycles.

Figure 1:
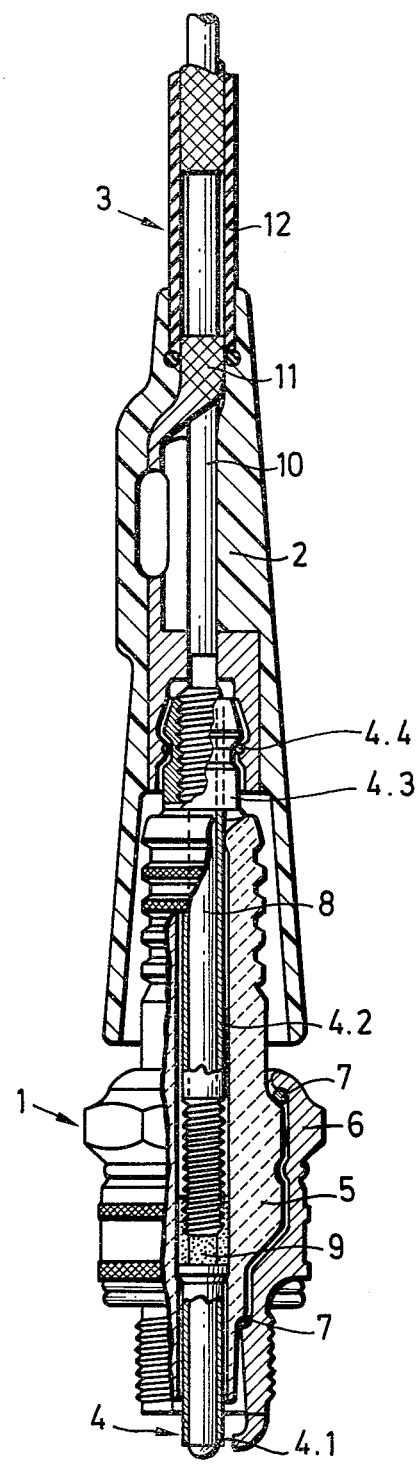
FIG. 1 is a schematic illustration in a partially sectioned view of one embodiment of the inventive knock sensor installed in a sparkplug.

Referring now to the drawings in detail, FIG. 1 is a cross section through a spark plug 1 with a slipped-on plug connector 2 and an ignition cable or plug wire 3 connected thereto. The spark plug 1 comprises a central electrode 4, an insulator 5, a housing 6, and sealing rings 7. The shape and dimensions of the last three items correspond to commercially available spark plugs.

To receive the knock sensor 8, the central electrode 4 is constructed as a sleeve structure and comprises a lower part 4.1 projecting into the combustion chamber. In the axial extension of the lower part 4.1, and spaced therefrom, follows the upper part 4.2, that end of which leaving the spark plug is provided in a known manner with a thread for receiving an intermediate sleeve 4.3. The connector 2 is fastened on the intermediate sleeve 4.3 by a known clamp connection 4.4.

The knock sensor 8 comprises a high-temperature resistant or refractory quartz glass rod which is arranged integrally in the central electrode parts, and that end of which facing the combustion chamber projects as a cupola or dome beyond the central electrode part 4.1. The other end of the knock sensor projects, as planar surface, from the upper end of the central electrode 4. The ground electrode is embodied as a side electrode because the end of the knock sensor 8 projects beyond the central electrode 4.

Stresses because of different expansion of quartz glass and chrome steel, of which the central electrode is formed, are prevented by the sleeve construction of the electrode part 4.1.

To immovably fasten both parts of the central electrode 4 as well as the knock sensor 8 in the spark plug or in the insulator 5, as well as to attain a sealing of the combustion chamber, an electrically conducting special melt or enamel 9 is provided in a known manner in the space or gap between the lower electrode part 4.1 and the upper electrode part 4.2.

The plug connector 2 simultaneously serves as a connection of the transmission mechanism 10, which is located within the plug wire 3, to the knock sensor 8. In this example, the transmission mechanism 10 likewise comprises photo-conductive fibers. However, no quartz glass rod needs to be provided because of the temperatures. The transmission mechanism leaves the plug connector with the plug wire 3. For this reason, the transmission mechanism is advantageously arranged within the plug wire 3, and is shrouded or sheathed by the ignition-current cable 11, which is surrounded by a rubber layer 12 in a known manner.

Figure 2:
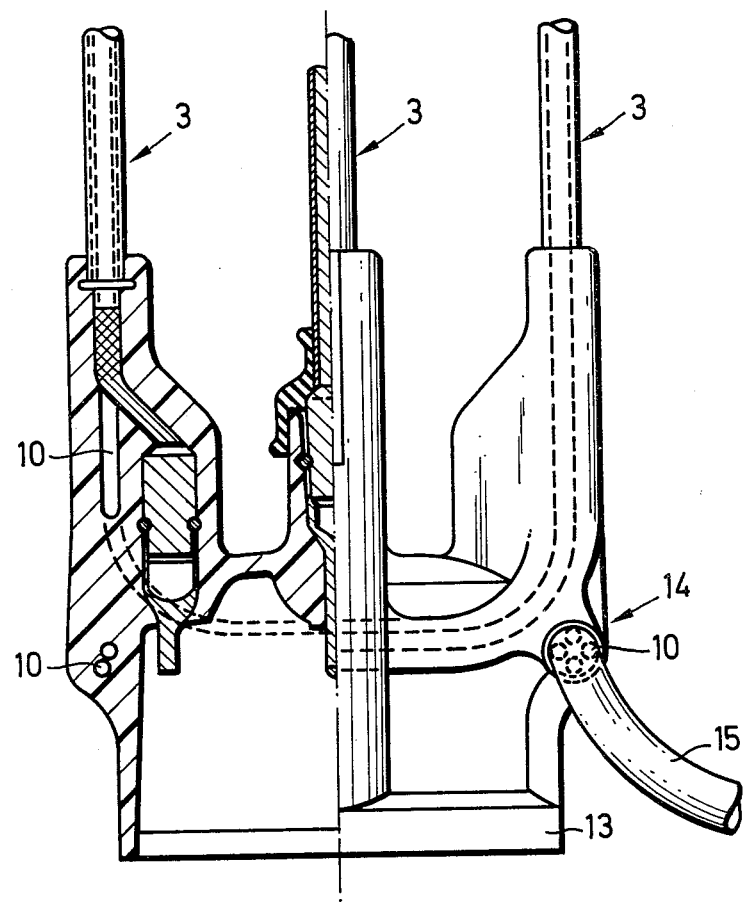
FIG. 2 is a schematic illustration in a partially sectioned view of the junction of the transmission mechanism within an ignition distributor cover or distributor cap.

FIG. 2 shows an ignition distributor cap or cover 13 to which all plug wires 3 from the various cylinders are joined in a known manner. Since the transmission mechanism 10 is arranged within the plug wire 3, the distributor cap is embodied in such a way that likewise therein there occurs a centralization or merger of the transmission mechanism 10. For this purpose, the individual transmission mechanisms 10 are bundled and collected at a suitable location 14. A further transmission device 15 is coupled at this collecting location 14, and comprises a single photo-conductive fiber rod of greater diameter. This photo-conductive fiber rod conducts the radiation signals to a processing device, not illustrated, which comprises a radiation receiver and signal converter with connected processing logic. The remaining construction of the distributor cap corresponds to those which are commercially available.

The radiation receiver and signal converter can be a photomultiplier, or a different device constructed of opto-electronic components.

FIG. 3 graphically illustrates an output signal generated from a photo-multiplier during knocking operation, over a crank angle. A strong fluctuation of the output signal is ascertainable from this graph in the region of the top dead center position, i.e. in the region of the crank angle of 180°. This denotes knocking operation.

If frequency analysis of the output signal from the photomultiplier is undertaken, the frequency spectrum illustrated in FIG. 4 is obtained from non-knocking operation.

FIG. 5 shows the frequency spectrum for knocking operation. It is clearly recognizable that in the region of 23 kHz and 46 kHz strong increased heights or peaks occur which indicate knocking operation. A comparison of FIG. 4 with FIG. 5 likewise shows clearly that the signal-noise difference amounts to approximately 50 decibels (dB).

All three graphs were determined using an AVL single cylinder engine (Anstalt für Verbrennungsmotor List—Institute for Internal Combustion Engines List) at a speed of 2,000 revolutions per minute, a compression ratio of $\epsilon = 9.08$, and an air ratio of $\lambda = 0.9$.

FIGS. 6A and 6B illustrate two block circuit diagrams of processing logic to show how the signal delivered according to the present invention can be processed to differentiate knock-free operation from knocking operation. Furthermore, with such a built-up processing logic, an evaluation of the knock signal can be attained to the end that conclusions as to the intensity of the knocking can be undertaken, as a result of which the quantity of the adjustment or control actions can be derived for a control device for the injection and/or the mixture preparation and/or the ignition time point and/or the intake pressure.

On the basis of the first possibility in FIG. 6A, the evaluation of a signal will be illustrated. For this purpose, both a known speed and reference-mark sensor 29, and the inventive knock sensor 21 with radiation receiver and signal converter, are arranged on the engine 20. The signal A delivered by the knock sensor and generated in the radiation receiver and signal converter is conducted through a band-pass amplifier 22, which filters the signal and adapts the level thereof, and delivers the output signal B, which is subsequently supplied to a square-law rectifier 23, the output of which supplies the signal $B^2$ to an integrator 24.

If the signal delivered from the speed and reference-mark sensor is processed in a time window generator 30 and is likewise supplied as signal F to the integrator, it is possible to determine the knock signal energies $E_n$ within a crank angle or time window. The knock signal energies $E_n$ are therefore calculated with respect to a crank angle or a specific time interval, and are expressed mathematically as follows:

$$E_n = \int_{t_1}^{t_2} B^2 dt \quad (1)$$

An average value $E_k$ 25 can be ascertained from these knock signal energies $E_n$, with the aid of a signal delivered from the speed and reference-mark sensor through a speed evaluation 31, according to the following mathematical equation:

$$E_k = \frac{1}{N} \sum_{n=1}^{N} E_n \quad (2)$$

where N is the number of cycles considered.

Furthermore, the knock signal energies $E_n$ can be utilized to determine peak values as follows:

$$E_m = \max_{n''1,N} \cdot E_n \quad (3)$$

Both results, both the average value $E_k$ as well as the peak value $E_m$, deliver criteria for whether, and with what intensity, knocking combustion exists.

An anti-knock adjustment would be necessary if the average value $E_k$ and/or the peak value $E_m$ exceed a predetermined limit. The extent of exceeding the limit delivers a basis or point of reference for the quantity of the necessary adjustment action.

If both criteria are numerically below a predetermined lower limit, and if the momentarily existing operating level of the internal combustion engine does not correspond to the optimum rated value, an adjustment can be carried out in the direction of the optimum operating level.

The second possibility in FIG. 6B of evaluating the knock signal energies $E_n$ consists of introducing the knock signal energies from the integrator 26' into a comparator 32, which always generates a counting pulse Z as an output signal when the knock signal energies $E_n$ exceed a reference value $E_r$ prescribed for the comparator. The signal Z is then utilized in a counter 33 with the signal delivered from the speed and reference-mark sensor to ascertain the relative frequency of the knocking cycles. The signal delivered by the knock-measurement counter can then either be indicated at block 27', or can be introduced as a control pulse to a control device 28' for changing the injection quantity and/or the mixture preparation and/or the ignition time point and/or the intake pressure.

The knock signal can then be processed analog or digital. Furthermore, the indicated processing logic can be used individually, or also as a component of a known gear shifting mechanism, for the control of the mixture preparation and/or the ignition time point and/or of the intake pressure.

The knock signal energies $E_n$ can be associated with a particular engine cylinder by determining and evaluating the speed, and by knowledge of the ignition sequence. Accordingly, it is possible to determine for each cylinder separately the average value $E_k$ and/or peak value $E_m$ and/or relative frequency $\psi$. As a result, each cylinder can be individually evaluated and controlled, which assures an optimum engine operation.

The present invention is, of course, in no way restricted to the specific disclosure of the specification and drawings, but also encompasses any modifications within the scope of the appended claims.

What I claim is:

1. A method of detecting knocking combustion during the operation of an externally auto-ignited internal combustion engine, said method comprising the steps of:

detecting the radiation emitted by the combustion chamber gases, which radiation changes during knocking combustion;

conveying said radiation to a processing device; and ascertaining from the detected radiation the knock-signal energies for each cycle.

2. A method according to claim 1, which includes the steps of employing and further processing only that portion of the detected radiation which occurs during knocking.

3. A method according to claim 1, which includes the steps of generating, from the knock-signal energies occurring with a defined number of cycles, at least one of an average value and a peak value; and utilizing these values to control at least one adjustment parameter which prevents knocking combustion.

4. A method according to claim 1, which includes the steps of counting the number of times the knock-signal energy exceeds a defined limit, which count, with reference to the number of sensed cycles, represents a measure of the relative frequency of the knocking cycles; and utilizing this measure as a criterion to control at least one adjustment parameter which prevents knocking combustion.

5. A method according to claim 1, which, in a multi-cylinder internal combustion engine, includes the steps of detecting the radiation in each cylinder; conveying this radiation to a common processing device; and undertaking in said processing device an individual evaluation for each cylinder as a function of the time sequence of the incoming radiation signals.

6. A method according to claim 5, which includes the steps of determining and evaluating the speed of said engine; associating the knock-signal energies with a particular cylinder as a function of the ignition sequence; and therewith determining for each cylinder separate values for at least one of an average value, peak values, and relative frequencies.

7. An apparatus for detecting knocking combustion during the operation of an externally auto-ignited multi-cylinder internal combustion engine, each cylinder of which has a sensor and a combustion chamber with a combustion chamber wall with the ignition sequence being spaced sufficiently apart, said apparatus comprising:

a photoelectric knock sensor associated with a given combustion chamber and terminating substantially flush with the wall thereof;

a processing device for receiving and processing knock signals from said sensor;

a transmission mechanism for carrying signals from said sensor to said processing device, said transmission mechanism of each cylinder being joined together at an ignition distributor cap and bundled at a collecting location as well as including a further transmission device in common conducting the knock signals to said processing device also in common therewith so that the knock signals of all cylinders are processed in said common processing device; and a control device operatively associated with said processing device and said engine for selectively controlling adjustment parameters which affect knocking.

8. An apparatus according to claim 7, wherein said further transmission device is a single photo-conductive fiber rod connected between the ignition distributor cap and said processing device.

9. An apparatus for detecting knocking combustion during the operation of an externally auto-ignited internal combustion engine, each cylinder of which has a combustion chamber with a combustion chamber wall, said apparatus comprising:

a photoelectric knock sensor associated with a given combustion chamber and terminating substantially flush with the wall thereof;

a processing device for receiving and processing knock signals from said sensor;

a transmission mechanism for carrying signals from said sensor to said processing device;

a control device operatively associated with said processing device and said engine for selectively controlling adjustment parameters which affect knocking;

each processing device comprising a radiation receiver for receiving signals from said sensor, a signal converter, and processing logic; and photoelectronic components as radiation receivers and signal converters, said photoelectronic components being photomultipliers.

10. An apparatus according to claim 9, in which that end of said sensor directed toward a given combustion chamber is arranged in the wall thereof in such a manner that the temperature prevailing there during engine operation exceeds the self-cleaning temperature of said sensor.

11. An apparatus according to claim 9, which includes a spark plug associated with each combustion chamber, a given sensor being arranged in a given spark plug.

12. An apparatus according to claim 11, in which each spark plug has a central electrode, said sensor being arranged in said central electrode.

13. An apparatus according to claim 11, which includes respective cables leading to said spark plugs, at least a part of said transmission mechanism being arranged within a given cable.

14. An apparatus according to claim 9, in which said sensor comprises photo-conductive fibers.

15. An apparatus according to claim 9, which includes at least one optical filter in said transmission mechanism.

16. An apparatus for detecting knocking combustion during the operation of an externally auto-ignited multi-cylinder internal combustion engine, each cylinder of which has a sensor and a combustion chamber with a combustion chamber wall with the ignition sequence being spaced sufficiently apart, said apparatus comprising:

a photoelectric knock sensor associated with a given combustion chamber and terminating substantially flush with the wall thereof;

a processing device for receiving and processing knock signals from said sensor;

a transmission mechanism for carrying signals from said sensor to said processing device, said transmission mechanism of each cylinder being joined together at an ignition distributor cap and bundled at a collecting location as well as including a further transmission device in common conducting the knock signals to said processing device also in common therewith so that the knock signals of all cylinders are processed in said common processing device;

a control device operatively associated with said processing device and said engine for selectively controlling adjustment parameters which affect knocking;

each processing device comprising a radiation receiver for receiving signals from said sensor, a signal converter, and processing logic.

17. An apparatus for detecting knocking combustion during the operation of an externally auto-ignited internal combustion engine, each cylinder of which has a combustion chamber with a combustion chamber wall, said apparatus comprising:

a photoelectric knock sensor associated with a given combustion chamber and terminating substantially flush with the wall thereof;

a processing device for receiving and processing knock signals from said sensor;

a transmission mechanism for carrying signals from said sensor to said processing device;

a control device operatively associated with said processing device and said engine for selectively controlling adjustment parameters which affect knocking;

each processing device comprising a radiation receiver for receiving signals from said sensor, a signal converter, and processing logic; and frequency-selective opto-electronic components as radiation receivers and signal converters, said components being selected with regard to their spectral sensitivity in such a way that only radiation of a wave length range which occurs only during knocking is recorded.

18. An apparatus according to claim 17, which includes photoelectronic components as radiation receivers and signal converters.

19. An apparatus according to claim 17, in which said opto-electronic components are frequency-selective photomultipliers.

20. An apparatus according to claim 17, in which, with a multi-cylinder internal combustion engine, each cylinder has a sensor, with the ignition sequence being spaced sufficiently apart; and which includes a single processing device for receiving and processing the knock signals from all of said sensors.

21. An apparatus for detecting knocking combustion during the operation of an externally auto-ignited internal combustion engine, each cylinder of which has a combustion chamber with a combustion chamber wall, said apparatus comprising:

a photoelectric knock sensor associated with a given combustion chamber and terminating substantially flush with the wall thereof;

a processing device for receiving and processing knock signals from said sensor;

a transmission mechanism for carrying signals from said sensor to said processing device;

a control device operatively associated with said processing device and said engine for selectively controlling adjustment parameters which affect knocking;

each processing device comprising a radiation receiver for receiving signals from said sensor, a signal converter, and processing logic;

said processing logic including a band-pass filter for receiving signals from said sensor, a square-law receitifer for receiving an output signal from said band-pass filter, an integrator for receiving a signal from said rectifier, and one of a crank angle and a time generator associated with said integrator.

22. An apparatus according to claim 21, in which said processing logic further includes at least one of a comparator and a knock-measurement counter.

* * * * *